United States Patent
Rane et al.

(10) Patent No.: US 12,367,402 B2
(45) Date of Patent: Jul. 22, 2025

(54) INTELLIGENT BACKUP AND RESTORATION OF CONTAINERIZED ENVIRONMENT

(71) Applicant: KYNDRYL, INC., New York, NY (US)

(72) Inventors: Girish Vilas Rane, Mumbai (IN); Pei Wen Khor, Singapore (SG); Kim Poh Wong, Singapore (SG)

(73) Assignee: Kyndryl, Inc, New York, NY (US)

( * ) Notice: Subject to any disclaimer, the term of this patent is extended or adjusted under 35 U.S.C. 154(b) by 1008 days.

(21) Appl. No.: 17/000,399

(22) Filed: Aug. 24, 2020

(65) Prior Publication Data

US 2022/0058498 A1    Feb. 24, 2022

(51) Int. Cl.
*G06N 5/04* (2023.01)
*G06F 3/06* (2006.01)
*G06N 20/00* (2019.01)

(52) U.S. Cl.
CPC ............. *G06N 5/04* (2013.01); *G06F 3/0619* (2013.01); *G06F 3/065* (2013.01); *G06F 3/0673* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 8,874,522 B2* | 10/2014 | Guo | .................... | G06F 11/1448 707/649 |
| 9,858,157 B2* | 1/2018 | Chavda | ............... | G06F 11/1451 |
| 10,437,683 B1* | 10/2019 | Kois | .................... | G06F 11/1433 |
| 10,621,019 B1* | 4/2020 | Faulhaber, Jr. | .......... | G06N 5/04 |
| 11,030,054 B2* | 6/2021 | Dain | .................... | G06F 11/1469 |
| 11,138,376 B2* | 10/2021 | Ralhan | .................. | G06F 16/116 |
| 11,188,386 B2* | 11/2021 | Okman | .................. | G06F 9/5072 |
| 11,270,077 B2* | 3/2022 | Tan | ........................ | G06N 20/00 |
| 11,275,519 B2* | 3/2022 | Ramachandran | ..... | G06F 3/0664 |
| 11,341,339 B1* | 5/2022 | Li | ............................ | G06F 40/40 |
| 11,748,166 B2* | 9/2023 | Reineke | ............ | G06Q 30/0633 718/104 |

(Continued)

OTHER PUBLICATIONS

B. Nicolae el at. "DataStates: Towards Lightweight Data Models for Deep Learning", Communications in Computer and Information Science, vol. 1315, SMC 2020, pp. 117-129, 2020.*

(Continued)

*Primary Examiner* — Maikhanh Nguyen
(74) *Attorney, Agent, or Firm* — Erik Swanson; Andrew D. Wright; Calderon Safran & Wright P.C.

(57) ABSTRACT

A system for determining the optimal backup and restore location for lightweight applications is provided. A computer device identifies a set of training data, wherein the training data identifies a lightweight container, a corresponding backup lightweight container, and an optimization score for the lightweight container and the corresponding backup lightweight container. The computing device trains a machine learning model utilizing the identified training data. The computing device identifies a new lightweight container for backup. The computing device determines an optimal backup lightweight container for the new lightweight container utilizing the trained machine learning model.

17 Claims, 7 Drawing Sheets

(56) References Cited

U.S. PATENT DOCUMENTS

| | | | |
|---|---|---|---|
| 2014/0122435 A1* | 5/2014 | Chavda | G06F 11/1438 |
| | | | 707/645 |
| 2018/0024893 A1* | 1/2018 | Sella | G06F 11/1458 |
| | | | 707/648 |
| 2018/0137139 A1 | 5/2018 | Bangalore | |
| 2019/0156244 A1* | 5/2019 | Faulhaber, Jr. | G06F 9/45558 |
| 2019/0179805 A1 | 6/2019 | Prahlad | |
| 2019/0318240 A1* | 10/2019 | Kulkarni | G06N 3/08 |
| 2020/0007620 A1 | 1/2020 | Das | |
| 2020/0042632 A1 | 2/2020 | Natanzon | |
| 2020/0057663 A1* | 2/2020 | Abbott | G06F 16/2228 |
| 2020/0233733 A1* | 7/2020 | Faulhaber, Jr. | G06N 5/04 |
| 2020/0241967 A1* | 7/2020 | Dain | G06F 11/0793 |
| 2020/0311617 A1* | 10/2020 | Swan | G06F 9/45558 |
| 2021/0011816 A1* | 1/2021 | Mitkar | G06F 11/301 |
| 2021/0406084 A1* | 12/2021 | Reineke | G06F 9/5044 |

OTHER PUBLICATIONS

Mell et al., "The NIST Definition of Cloud Computing", Recommendations of the National Institute of Standards and Technology, NIST Special Publication 800-145, Sep. 2011, 7 pages.

* cited by examiner

INTELLIGENT BACKUP AND RESTORATION OF CONTAINERIZED ENVIRONMENT

BACKGROUND OF THE INVENTION

The present invention relates generally to the field of data backup and storage, and more particularly to the backup and storage of software containers.

Generally, in a containerized environment, data is compressed and stored to create a lightweight application that can be implemented in various operating systems without the overhead of associating an operating system within each application.

SUMMARY

Embodiments of the present invention provide a method, system, and program product to determine the optimal backup and restore location for lightweight applications.

A first embodiment encompasses a method where one or more processors identify a set of training data, wherein the training data identifies a lightweight container, a corresponding backup lightweight container, and an optimization score for the lightweight container and the corresponding backup lightweight container. One or more processors train a machine learning model utilizing the identified training data. One or more processors identify a new lightweight container for backup. The one or more processors determine an optimal backup lightweight container for the new lightweight container utilizing the trained machine learning model.

A second embodiment encompasses a computer program product that includes one or more computer readable storage media and program instructions stored on the one or more computer-readable storage media. The program instructions include program instructions to identify a set of training data, wherein the training data identifies a lightweight container, a corresponding backup lightweight container, and an optimization score for the lightweight container and the corresponding backup lightweight container. The program instructions include program instructions to train a machine learning model utilizing the identified training data. The program instructions include program instructions to identify a new lightweight container for backup. The program instructions include program instructions to determine an optimal backup lightweight container for the new lightweight container utilizing the trained machine learning model.

A third embodiment encompasses a computer system that includes one or more computer processors, one or more computer-readable storage media, and program instructions stored on the computer-readable storage media for execution by at least one of the one or more processors. The program instructions include program instructions to identify a set of training data, wherein the training data identifies a lightweight container, a corresponding backup lightweight container, and an optimization score for the lightweight container and the corresponding backup lightweight container. The program instructions include program instructions to train a machine learning model utilizing the identified training data. The program instructions include program instructions to identify a new lightweight container for backup. The program instructions include program instructions to determine an optimal backup lightweight container for the new lightweight container utilizing the trained machine learning model.

DETAILED DESCRIPTION

Detailed embodiments of the present invention are disclosed herein with reference to the accompanying drawings. It is to be understood that the disclosed embodiments are merely illustrative of potential embodiments of the present invention and may take various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention will now be described in detail with reference to the Figures.

Figure 1:
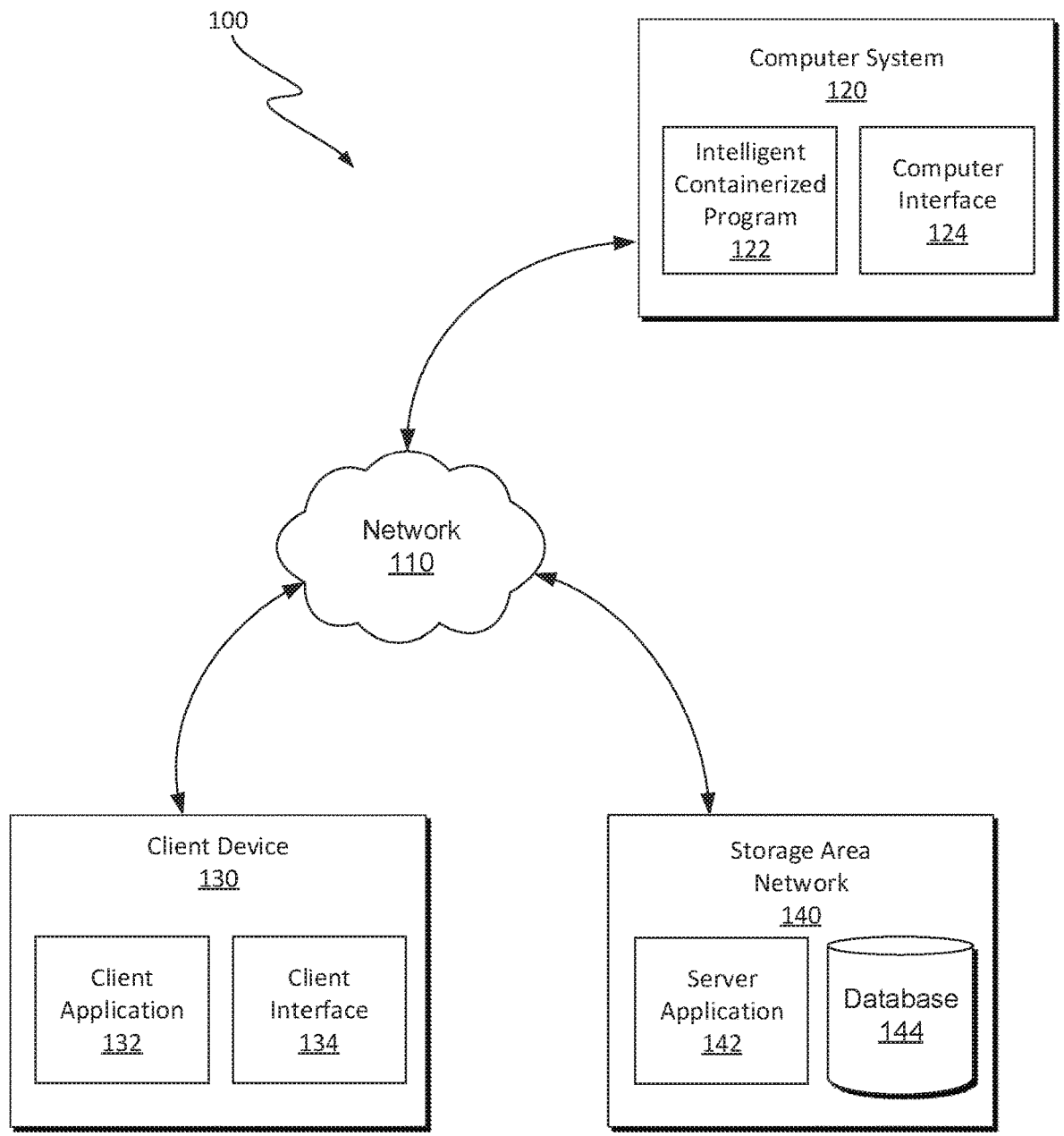
FIG. 1 is a functional block diagram illustrating a computing environment, in which a computing device determines the optimal backup and restore location, accordance with an exemplary embodiment of the present invention.

FIG. 1 is a functional block diagram illustrating computing environment, generally designated 100, in accordance with one embodiment of the present invention. Computing environment 100 includes computer system 120, client device 130, and storage area network (SAN) 140 connected over network 110. Computer system 120 includes intelligent containerization program 122 and computer interface 124. Client device 130 includes client application 132 and client interface 134. Storage area network (SAN) 140 includes server application 142 and database 144.

In various embodiments of the present invention, computer system 120 is a computing device that can be a standalone device, a server, a laptop computer, a tablet computer, a netbook computer, a personal computer (PC), a personal digital assistant (PDA), a desktop computer, or any programmable electronic device capable of receiving, sending, and processing data. In general, computer system 120 represents any programmable electronic device or combination of programmable electronic devices capable of executing machine readable program instructions and communications with various other computer systems (not shown). In another embodiment, computer system 120 represents a computing system utilizing clustered computers and components to act as a single pool of seamless resources. In general, computer system 120 can be any computing device or a combination of devices with access to various other computing systems (not shown) and is capable of executing intelligent containerization program 122 and computer interface 124. Computer system 120 may include internal and external hardware components, as described in further detail with respect to FIG. 1.

In this exemplary embodiment, intelligent containerization program 122 and computer interface 124 are stored on computer system 120. However, in other embodiments, intelligent containerization program 122 and computer interface 124 are stored externally and accessed through a communication network, such as network 110. Network 110 can be, for example, a local area network (LAN), a wide area network (WAN) such as the Internet, or a combination of the two, and may include wired, wireless, fiber optic or any other connection known in the art. In general, network 110 can be any combination of connections and protocols that will support communications between computer system 120, client device 130, SAN 140, and various other computer systems (not shown), in accordance with desired embodiment of the present invention.

In various embodiments of the present invention, the various other computer systems (not shown) can be a standalone device, a server, a laptop computer, a tablet computer, a netbook computer, a personal computer (PC), a desktop computer, or any programmable electronic device capable of receiving, sending, and processing data. In another embodiment, the various other computer system represents a computing system utilizing clustered computers and components to act as a single pool of seamless resources. In general, the various other computer systems can be any computing device or combination of devices with access to computer system 120, client device 130, SAN 140 and network 110 and is capable of executing intelligent containerization program 122 and computer interface 124. The various other computer systems may include internal and external hardware components as depicted and described in further detail with respect to FIG. 1.

In the embodiment depicted in FIG. 1, intelligent containerization program 122, at least in part, has access to client application 132 and can communicate data stored on computer system 120 to client device 130, SAN 140, and various other computer systems (not shown). More specifically, intelligent containerization program 122 defines a user of computer system 120 that has access to data stored on client device 130 and database 144.

Intelligent containerization program 122 is depicted in FIG. 1 for illustrative simplicity. In various embodiments of the present invention, intelligent containerization program 122 represents logical operations executing on computer system 120, where computer interface 124 manages the ability to view these logical operations that are managed and executed in accordance with intelligent containerization program 122. In some embodiments, intelligent containerization program 122 represents a cognitive AI system that processes and analyzes input and output (I/O). Additionally, intelligent analyzation program 122, when executing cognitive AI processing, operates to learn from the I/O that was analyzed and determines the optimal backup and storage location for the data stored on the lightweight application.

Computer system 120 includes computer interface 124. Computer interface 124 provides an interface between computer system 120, client device 130, and SAN 140. In some embodiments, computer interface 124 can be graphical user interface (GUI) or a web user interface (WUI) and can display text, documents, web browsers, windows, user options, applications interfaces, and instructions for operation, and includes the information (such as graphic, text, and sound) that program presents to a user and control sequences the user employs to control the program. In some embodiments, computer system 120 accesses data communicated from client device 130 and/or SAN 140 via a client-based application that runs on computer system 120. For example, computer system 120 includes mobile application software that provides an interface between computer system 120, client device 130, and SAN 140.

In various embodiments, client device 130 is a computing device that can be a standalone device, a server, a laptop computer, a tablet computer, or any programmable electronic device capable of receiving, sending and processing data. In general, computer system 120 represents any programmable electronic device or combination of programmable electronic devices capable of executing machine readable program instructions and communications with various other computer systems (not shown).

Client application 132 is depicted in FIG. 1 for illustrative simplicity. In various embodiments of the present invention, client application 132 represents logical operations executing on client device 130, where client interface 134 manages the ability to view these logical operations that are managed and executed in accordance with client application 132. In various embodiments, client application 132 defines a user of client device 130 that has access to data stored on computer system 120 and/or database 142.

Storage area network (SAN) 140 is storage system that includes server application 142 and database 144, SAN 140 may include one or more, but is not limited to, computing devices, servers, server-clusters, web-servers, databases and storage devices. SAN 140 operates to communicate with computer system 120, client device 130, and various other computing devices (not shown) over a network, such as network 110. For example, SAN 140 communicates with intelligent containerization program 122 to transfer data between computer system 120, client device 130, and various other computing devices (not shown) that are connected to network 110. SAN 140 can be any computing device or a combination of devices that are communicatively connected to a local IoT network, i.e., a network comprised of various computing devices including, but are not limited to a computer system 120 and client device 130 to provide the functionality described herein. SAN 140 can include internal and external hardware components as described with respect to FIG. 6. The present invention recognizes that FIG. 1 may include any number of computing devices, servers, databases, and/or storage devices, and the present invention is not limited to only what is depicted in FIG. 1. As such, in some embodiments, some or all of the features and functions of SAN 140 are included as part of computer system 120, client device 130 and/or another computing device. Similarly, in some embodiments, some of the features of computer system 120 are included as part of SAN 140 and/or another computing device.

Additionally, in some embodiments, computer system 120 and SAN 140 represent, or are part of, a cloud computer platform. Cloud computing is a model or service delivery for enabling convenient, on-demand network access to a shared pool of configurable comprising resources (e.g., networks, network bandwidth, servers, processing, memory, storage, applications, virtual machines, and service(s) that can be rapidly provisioned and released with minimal management effort or interaction with a provider of service. A cloud model may include characteristics such as on-demand self-service, broad network access, resource pooling, rapid elasticity, and measured service, can be represented by service models including a platform of as service (PaaS) model, an infrastructure as a service (IaaS) model, and a software as a service (SaaS) model, and can be implemented as various deployment models including as a private cloud, a community cloud, a public cloud, and a hybrid cloud.

SAN 140 is depicted in FIG. 1 for illustrative simplicity. However, it is to be understood that, in various embodiments, SAN 140 can include any number of databases that are managed in accordance with the functionality of server application 142. In general, database 144 represents data and server application 142 represents code that provides an ability to take specific action with respect to another physical or virtual resource and manages the ability to use and modify the data. In an alternative embodiment, intelligent containerization program 122 can also represent any combination of the aforementioned features, in which server application 142 has access to database 144. To illustrate various aspects of the present invention, examples of server application 142 are presented in which intelligent containerization program 122 represents one or more of, but is not limited to, a local IoT network.

In some embodiments, server application 142 and database 144 are stored on SAN 140. However, in various embodiments, server application 142 and database 144 may be stored externally and accessed through a communication network, such as network 110, as discussed above.

Intelligent containerization program 122 is depicted in FIG. 1 for illustrative simplicity, computer system 120, however, can include any number of logics and/or programs that are managed in accordance with intelligent containerization program 122. In general, computer system 120 manages access to intelligent containerization program 122, which represents a physical or virtual resource. In some embodiments, intelligent containerization program 122 includes certain information and code that, when executed, enables computer system 120 to take specific action with respect to another physical and/or virtual resource based on, but is not limited to, that certain information and code. In other words, in such embodiments, intelligent containerization program 122 manages, at least, the ability of computer system 120 to take various actions with respect to one or more physical resources and/or virtual resources. In some embodiments, intelligent containerization program 122 can also embody any combination of the aforementioned elements. To illustrate various aspects of the present invention, examples of intelligent containerization program 122 are presented in which intelligent containerization program 122 includes one or more of, but is not limited to, a user profile request, backup and restore request, and intelligent learning to optimize backup and restore location, but embodiments of intelligent containerization program 122 are not limited thereto. Embodiments of the present invention recognize that intelligent containerization program 122 may include other forms of backup and restore requests that are known in the art.

In various embodiments of the present invention, intelligent containerization program 122 represents a machine learning model, wherein the machine learning model comprises input/output (I/O). In various embodiments, intelligent containerization program 122 analyzes I/O and learns a pattern of predicted outcomes based on the output. In various embodiments, intelligent containerization program 122 analyzes input data and determines a predicted pattern of outcomes based on, but not limited to, the historical learned pattern of predicted outcomes.

In various embodiments of the present invention, the lightweight applications need to be backed-up and restored from time to time. The present invention recognizes that the nodes and the storage devices connect to an API server that directly connections to the cloud. Further, additional nodes are capable of spinning-up to operate on additional storage or in a virtualized environment and are capable of running the lightweight application.

In various embodiments of the present invention, a user of client device 130 utilizing client application 132 generates a software application and generates (i) a manifest, (ii) an image (e.g., that describes the container), and (iii) the actual container. In some embodiments, client application 132 generates a lightweight container containing the data of the software application and communicates the lightweight container to SAN 140 for storage.

In various embodiments, SAN 140 receives the lightweight container and utilizing server application 142 stores the lightweight container on database 144. It should be appreciated that database 144 is depicted for illustrative simplicity. In various embodiments, database 144 represents a collection of databases, servers, storage devices, etc. all connected together to share and communicate data.

In various embodiments of the present invention, intelligent containerization program 122 generates a backup and restore request. In various embodiments, intelligent containerization program 122 identifies at least one master node and at least one worker node connected to at least a first storage device (e.g., database 144). Additionally, intelligent containerization program 122 identifies one or more storage devices, wherein at least a plurality of worker nodes is connected to each additional storage device. The present invention recognizes that the master node and the worker nodes are responsible for running the containerized applications. In various embodiments, the master node and the worker nodes run the lightweight application.

In various embodiments of the present invention, intelligent containerization program 122 operates to identify the optimized backup location to restore the lightweight applications from data loss or corruption. In various embodiments, intelligent containerization program 122 identifies one or more storage locations and constructs the optimal approach to backup the data and restore the data from the containerized environment. Additionally, intelligent containerization program 122 identifies the optimal location to store the data of the lightweight containers to retrieve the data in a threshold speed for optimal recovering of the data. Lastly, the machine learning model of embodiments of the present invention leverages the historical data for identifying the optimal data storage to achieve the optimal backup and restore location based on, but not limited to, the intelligent algorithm formula.

Embodiments of the present invention recognize that a container image is a static file that contains executable code for the container to run. In various embodiments, if changes are made to the libraries and code for the given container, intelligent containerization program 122 generates a new image for the container. Intelligent containerization program 122 protects the container image by storing the image on a repository to prevent protect against disasters and disruption of the container itself. In various embodiments, intelligent containerization program 122 utilizes the backup and restore algorithms to restore the container images during disaster or disruption of the container.

Embodiments of the present invention recognize that containers often create data that outlives the life of the container, and in order to accomplish this task, intelligent containerization program 122 mounts a volume via a network file system (NFS) to an object store or similar mechanism, and writes the data to that volume. In some embodiments, intelligent containerization program 122 makes a connection to a database to store data that can be accessed by external users. In various embodiments, intelligent containerization program 122 utilizes the backup and restore algorithm to provide identification of an environment to backup during a critical situation of the container (e.g., disaster or disruption) and ensure that the data is restored without data loss. In various embodiments, intelligent containerization program 122 hosts the data in a cloud environment to support large transactions.

In various embodiments of the present invention, raw and unstructured data is identified by intelligent containerization program 122. Intelligent containerization program 122 utilizes the intelligent backup and restore algorithm for (i) location retrieval of the optimal method, (ii) latency method, (iii) pointer and non-pointer data, and (iv) specific backup software to be used. Based on, at least, the intelligent backup and restore algorithm, intelligent containerization program 122 determines the optimized backup location.

In various embodiments, the location and construct of the backup data defines the most optimal approach to the backup and restore algorithm to restore the data stored on the lightweight application. In various embodiments, the intelligent containerization program 122 identifies the best location for storage that allows for the fastest retrieval of the data from the master nodes and the working nodes, wherein this threshold level of speed for retrieval defines the optimal storage location for recovering data. In various embodiments, intelligent learning is utilized within the backup and restore method to ensure that the optimal storage location is determined based on, at least, the backup and restore algorithm (e.g., equation (1)). In various embodiments, intelligent containerization program 122 determines the best fit construct after reviewing the different approaches for the optimal backup and restore location based on, but not limited to, various scenario-specific constraints. In one embodiment and example, intelligent containerization program 122 retrieves a single file from a plurality of files (e.g., thousands of files), wherein intelligent containerization program 122 manages the outcome from the backup and restore algorithm to calculate the optimal storage location for this singular file.

Figure 2:
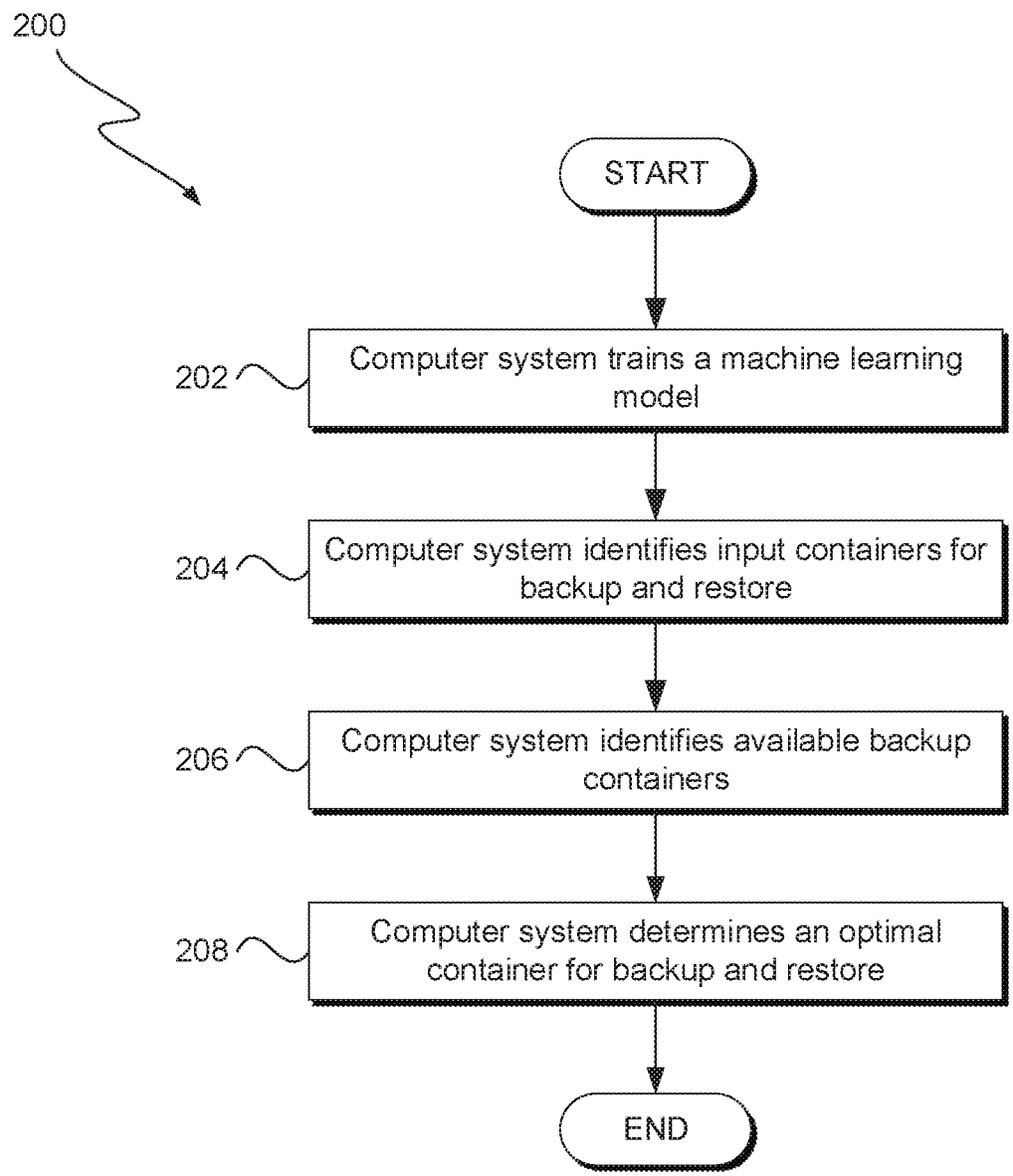
FIG. 2 illustrates operational processes of executing a system for determines the optimal backup and restore location, on a computing device within the environment of FIG. 1, in accordance with an exemplary embodiment of the present invention.

FIG. 2 is a flowchart, 200, depicting operations of intelligent containerization program 122 in computing environment 100, in accordance with an illustrative embodiment of the present invention. FIG. 2 also represents certain interactions between intelligent containerization program 122 and server application 142. In some embodiments, the operations depicted in FIG. 2 incorporate the output of certain logical operations of intelligent containerization program 122 executing on computer system 120. It should be appreciated that FIG. 2 provides an illustration of one implementation and does not imply any limitations with regard to the environments in which different embodiments may be implemented. Many modifications to the depicted environment may be made. In one embodiment, the series of operations in FIG. 2 can be performed in any order. In another embodiment, the series of operations depicted in FIG. 2 can be performed simultaneously. Additionally, the series of operations, depicted in FIG. 2, can be terminated at any operation. In addition to the features previously mentioned, any operations, depicted in FIG. 2, can be resumed at any time.

In operation 202, intelligent containerization program 122 trains a machine learning model. In various embodiments, intelligent containerization program 122 analyzes input container data that includes, but is not limited to, (i) unstructured container data and (ii) configuration data. Further, in various embodiments, intelligent containerization program 122 analyzes (iii) backup data regarding the backup container (e.g., a corresponding backup lightweight container). Additionally, intelligent containerization program 122 trains a machine learning model utilizing the optimization score calculated from the backup and restore algorithm (equation (1)). In various embodiments, the machine learning model learns a pattern of predicted storage locations for data backup and restore. In various embodiments, intelligent containerization program 122 determines the optimal storage locations that represent the highest value of the intelligent backup and restore algorithm (e.g., optimization score). Additionally, in various embodiments, intelligent containerization program 122 determines a threshold frequency of occurrences, in which one or more storage locations are frequently calculated to be an optimal storage location for backup and restore of the data of the lightweight applications.

In various embodiments, intelligent containerization program 122 provides a set of training data to the machine learning model to train the machine learning model to predict an optimal storage location for backup and restore of the data stored on the lightweight containers (e.g., input containers). In various embodiments, intelligent containerization program 122 provides the machine learning model with data that represents the configuration data and the unstructured data of the lightweight applications, and the backup storage location data. Additionally, intelligent containerization program 122 calculates the optimization score based on, at least, the backup and restore algorithm (e.g., equation (1)), wherein intelligent containerization program 122 utilizing values of the K-means threshold, the latency constraint, and the configuration data. Intelligent containerization program 122 provides the optimization score to the machine learning model to train the machine learning model to predict the optimal storage location. In various embodiments, the machine learning model is trained based on, at least, the data provided, as described above, and is able to generate a new optimization score and predict the optimal backup storage location based on being provided data that includes, but is not limited to, the configuration data and the unstructured data of the lightweight applications, and the backup storage location data.

Embodiments of the present invention provide for intelligent containerization program 122 to determine an optimal location for the backup and restore of the data stored on the lightweight application based on, at least, the unstructured data of the lightweight application. In various embodiments, intelligent containerization program 122 utilizes a K-means algorithm for vector quantization and partitioning the unstructured data into n-partitions of K clusters, wherein each cluster belongs to the nearest mean value of the unstructured data. In various embodiments, the respective patterns from the unstructured container data of the new lightweight container represent the n-partitions of K clusters.

In various embodiments of the present invention, intelligent containerization program 122 utilizes the K-means algorithm to partition the dataset stored on the lightweight application into K-predefined distinct non-overlapping subgroups, wherein each data point of the dataset stored on the lightweight application belongs to only a singular group. Intelligent containerization program 122 calculates the intra-cluster data points and attempts to make the intra-cluster data points as similar as possible while maintain a threshold level of separation between the individual clusters.

In various embodiments, intelligent containerization program 122 utilizes annotations to determine the backup requirement of the data. Embodiments of the present invention recognize that annotation data is used to identify patterns of the data to be backup and restored and confirms the contents used for verification of the backup and restore algorithm. In various embodiments, intelligent containerization program 122 determines the highest probability that the backup and restore would be executed based on, but not limited to, a backup and restore rule, wherein the datasets must be backed-up within the pre-identified criteria and timeline and determine the dataset which meets the backup and restore rule.

In various embodiments, intelligent containerization program 122 further calculates a latency constraint of the one or more storage devices. Embodiments of the present invention recognize that intelligent containerization program 122 utilizes a threshold method to calculate the latency constraint (e.g., a value of 0.6). In various embodiments, the calculation of the latency constraint is utilized to determine the proxy requirement of the storage location. Additionally, the latency constraint is utilized to ensure the backup contents and ability to restore the data. In various embodiments, intelligent containerization program 122 utilizes the latency constraint during a disruption to restore the data upon analysis of the backup and restore algorithm. In various embodiments, intelligent containerization program 122 leverages the backup and restore algorithm with an orchestration tool to execute the backup and restore of the data in the containerized environment based on, but not limited to, various impacts of the threshold method. Additionally, intelligent containerization program 122 utilizes the latency constraint to consider additional methods to restore the data in containerized environments during instances of data restoration.

In various embodiments, intelligent containerization program 122 further calculates the identified configurations and mounts the configuration directly into the backup container's filesystem. In various embodiments, the configuration files include data that represent, but are not limited to, bind-mount contents or environment use variables. In various embodiments, the configuration data includes, but is not limited to, the resource management parameter (e.g., CPU, disk, system, vswamp, etc.), networking parameter (e.g., hostname, ip-address, netfilter, nameserver, etc.), and miscellaneous (e.g., identifier, version, allow-reboot, template, customized matrix, etc.). In various embodiments, intelligent containerization program 122 identifies the container image that includes, at least, a static file that represents the executable code necessary for the container to run. Embodiments of the present invention recognize that the container images allow a specific container to run. Additionally, if intelligent containerization program 122 needs to make changes to the libraries and code for a given container, intelligent containerization program 122 generates a new image for the container. In various embodiments, intelligent containerization program 122 utilizes the quick identification method (e.g., value of 0.7) to ensure the restore-window is able to meet or exceed the operation requirements of the intelligent algorithm to backup and restore the data. Embodiments of the present invention further recognize that intelligent containerization program 122 utilizes the quick identification method to complete execution of the backup and restore requirements throughout its duration. Additionally, one having ordinary skill in the art would understand that the restore-window represents a required backup period of time, wherein the backup and restore of the data stored on the lightweight applications occurs within a threshold period of time.

In various embodiments, intelligent containerization program 122 utilizes the value outputs from (i) the K-mean algorithm, (ii) the threshold method, and (iii) the quick identification method to calculate a value for optimized backup and restore of the data on the lightweight applications. In various embodiments, intelligent containerization program 122 leverages the intelligent backup and restore algorithm with an orchestration tool to execute the backup and restore of the data on the lightweight applications within a de minimis threshold period of time.

The following equation (1) represents processing that may be performed to determine the optimal backup and restore location of data for the lightweight containers.

Equation (1): Intelligent backup and restore algorithm $$\text{Intelligent backup and restore algorithm} = \text{Probability of [K-mean+Threshold method+quick identification method]}/3$$

In various embodiments, intelligent containerization program 122 calculates the optimization score for the data on the lightweight containers based on, but not limited to, the intelligent backup and restore algorithm. In some embodiments, intelligent containerization program 122 determines the optimization score for the data, wherein the value (e.g., backup optimization score) associated with intelligent backup and restore algorithm is between a value of 1 and 0. In some embodiments, intelligent containerization program 122 calculates the optimization score of the intelligent backup and restore algorithm to be equal to or greater than 0.5, wherein intelligent containerization program 122 determines that this is an optimal location for backup and restore of the data on the lightweight applications. In some embodiments, intelligent containerization program 122 calculates the optimization score of the intelligent backup and restore algorithm less than 0.5, wherein intelligent containerization program 122 determines that this is not an optimal location for backup and restore of the data on the lightweight applications. In various embodiments, if intelligent containerization program 122 determines that this location is not optimal for backup and restore based on, but not limited to, the value produced by the calculation of the intelligent backup and restore algorithm, then intelligent containerization program 122 identifies one or more storage locations.

Embodiments of the present invention recognize that intelligent containerization program 122 provides the calculated optimization scores of the various backup containers to the machine learning model to train the machine learning model. In various embodiments, the machine learning model learns the optimal storage location for the data stored on the lightweight applications based on, at least, the calculated optimization score.

In operation 204, intelligent containerization program 122 identifies input containers (i.e., lightweight applications) to backup and restore the data stored on the input containers. In various embodiments, intelligent containerization program 122 identifies backup locations for the lightweight application. In various embodiments, intelligent containerization program 122 identifies an input container for backup of the stored on the input container (e.g., lightweight application). In some embodiments, the input container identified by intelligent containerization program 122 includes, but is not limited to, unstructured container data (e.g., text-heavy based contents such as data, number, timestamp, transaction record, container name, different logs, etc.) and configuration data (e.g., resource management parameters (e.g., CPU, disk, system, vswap, etc.), networking parameters (e.g., hostname, ip-address, netfilter, nameserver, etc.) and miscellaneous parameters (e.g., identifier, version, allow-reboot, template, customized matrix, etc.)) associated with the input container.

In operation 206, intelligent containerization program 122 identifies available containers (i.e., backup storage locations) for backup and restore. In various embodiments, intelligent containerization program 122 identifies backup locations for the optimal storage location. In various embodiments, intelligent containerization program 122 identifies one or more storage devices and one or more nodes capable of executing the backup storage location. Additionally, intelligent containerization program 122 identifies one or more storage device locations based on, but not limited to, where the container environment is hosted and mounted onto the storage logical unit number (LUN) to store the data located on the lightweight application.

In various embodiments, intelligent containerization program 122 identifies a backup container for backup of the data stored in the lightweight application (e.g., input container). In some embodiments, the backup container identified by intelligent containerization program 122 includes, but is not limited to, unstructured container data (e.g., text-heavy based contents such as data, number, timestamp, transaction record, container name, different logs, etc.) and configuration data (e.g., resource management parameters (e.g., CPU, disk, system, vswap, etc.), networking parameters (e.g., hostname, ip-address, netfilter, nameserver, etc.) and miscellaneous parameters (e.g., identifier, version, allow-reboot, template, customized matrix, etc.)). In various embodiments of the present invention, intelligent containerization program 122 identifies additional backup locations, wherein the additional backup locations include, but not limited to, location data for the trained machine learning model to generate an optimization score to predict the optimal storage location for the data stored on the lightweight application.

In operation 208, intelligent containerization program 122 determines an optimal backup and storage location for the data stored on the lightweight application based on, at least, the trained machine learning model. In various embodiments, the trained machine learning model determines various pairings between the input containers and the backup containers provided by, at least, intelligent containerization program 122. Additionally, in various embodiments, the trained machine learning model generates an optimization score based on, at least, the data (e.g., unstructured data, configuration data, and backup data) provided by intelligent containerization program 122 for each pairing between the input containers and the backup containers. In various embodiments, intelligent containerization program 122 analyzes the optimization scores and determines the optimal storage location for the data stored on the input container (e.g., lightweight application) based on, at least, the highest threshold level value of the optimization score.

In various embodiments, intelligent containerization program 122 calculates the unstructured data optimization utilizing a K-means algorithm (e.g., mean value of 0.5). Embodiments of the present invention recognize that the K-means algorithm is a method of vector quantization and partitions n-variables into K clusters, wherein each observation belongs to a cluster with the nearest mean value. In various embodiments, intelligent containerization program 122 utilizes unstructured data from the container that includes, but is not limited to, text-heavy based contents such as date, number, timestamp, transaction record, container name, different logs, etc. to calculate the unstructured data optimization utilizing the K-means algorithm.

In various embodiments, intelligent containerization program 122 calculates the latency constraint of the one or more storage devices. Embodiments of the present invention recognize that intelligent containerization program 122 utilizes a threshold method to calculate the latency constraint (e.g., a value of 0.6). In various embodiments, the calculation of the latency constraint is utilized to determine the proxy requirement of the storage location. Additionally, the latency constraint is utilized to ensure the backup contents and ability to restore the data. In various embodiments, intelligent containerization program 122 utilizes the latency constraint during a disruption to restore the data.

In various embodiments, intelligent containerization program 122 further calculates the identified configurations and mounts the configuration directly into the backup container's filesystem. In various embodiments, the configuration files include data that represent, but are not limited to, bind-mount contents or environment use variables. In various embodiments, the configuration data includes, but is not limited to, the resource management parameter (e.g., CPU, disk, system, vswamp, etc.), networking parameter (e.g., hostname, ip-address, netfilter, nameserver, etc.), and miscellaneous (e.g., identifier, version, allow-reboot, template, customized matrix, etc.). In various embodiments, intelligent containerization program 122 utilizes the quick identification method (e.g., value of 0.7) to ensure the restore-window is able to meet or exceed the operation requirements to backup and restore the data.

Embodiments of the present invention recognize that intelligent containerization program 122 provide the (i) unstructured data, (ii) the latency constraint, (iii) a value of the quick identification method, and (iv) the backup container's data to the trained machine learning model to generate an optimization score and predicts a optimal storage location for the data stored on the lightweight application. In various embodiments, the trained machine learning model analyzes the data provided and generates an optimization score (e.g., the value calculated from the backup and restore algorithm). In various embodiments, the trained machine learning model predicts the optimal storage location based on, at least, the generated optimization score. Embodiments of the present invention recognize that the generated optimization score is associated with a backup container that was identified by intelligent containerization program 122.

In various embodiments, intelligent containerization program 122 integrates with an orchestration tool (e.g., server application 142) to execute a backup within a de minimis threshold period of time. In some embodiments, the orchestration tool allows the intelligent containerization program 122 to coordinate the backup and restore the data of the lightweight applications based on, but not limited to, the values of the intelligent backup and restore algorithms of the various storage locations. In some embodiments, intelligent containerization program 122 utilizes the optimal location for backup and restore of the data. Alternatively, intelligent containerization program 122 identifies that the optimal storage locations have utilized all resources and cannot be utilized for backup and restore. In the event that intelligent containerization program 122 cannot identify the optimal storage location, intelligent containerization program 122 recalculates the value for the intelligent backup and restore algorithm.

In one example embodiment, intelligent containerization program 122 is trained using the following data, with reference to operation 202. In this example embodiment, we have input container Z (e.g., hostname: exampleZ.example-.com) that has used at least 4.6 gigabytes (GB) of data and was last accessed on January $1^{st}$. Additionally, within the example embodiment, configuration data includes a CPU that specifies a deployment location with at least 8 available cores operating at 2.5 gigahertz (GHz), includes 8 GB of memory and 1 GB of vswap. Lastly, in this example embodiment, the backup location data includes a geographic location with reference to the containers. In this example embodiment, input container Z is located 20 miles away from backup container A and 100 miles away from backup container B. Additionally, in this example embodiment, we have input container Y (e.g., exampleY.example.com) which has used, at least, 7.2 GB of data and was last accessed on December $1^{st}$ and has configuration data that includes a CPU that specifies a deployment location with at least 4 available cores operating at 2 gigahertz (GHz), includes 8 GB of memory and 1 GB of vswap, and is located 100 miles away from backup container A and 5 miles away from backup container B.

In this example embodiment, intelligent containerization program 122 identifies the unstructured container data and configuration data for input container Z (e.g., exampleZ.example.com) and input container Y (e.g., exampleY.example-.com). Additionally, intelligent containerization program 122 identifies backup location data (such as latency information and location information) for backup container A and for backup container B. Lastly, intelligent containerization program 122 identifies the annotations for each combination of input container and backup container, wherein the annotations reflect how optimal each combination of input container and backup container is. For example, in this embodiment, the annotations are generated using equation (1), discussed above. In this embodiment, intelligent containerization program 122 identifies, for input container Z, that backup container A has an annotation value of 0.8 and that backup container B has an annotation value of 0.6. Intelligent containerization program 122 also identifies, for input container Y, that backup container A has an annotation value of 0.5 and backup container B has an annotation value of 0.6. These values are used in combination with the (i) the unstructured container data, (ii) the configuration data, and (iii) the backup location data to train the machine learning model of intelligent containerization program 122 to generate new annotation values (or "backup optimization scores") for new combinations of input containers and backup containers provided to the model in the future.

In this example embodiment, with reference now to operation 204, intelligent containerization program 122 identifies input container W for backup and restore. In this example embodiment, the unstructured data for input container W (e.g., exampleW.example.com) is that input container W has used at least 2.2 gigabytes (GB) of data and was last accessed on January $15^{th}$. Additionally, the configuration data for input container W includes a CPU that specifies a deployment location with at least 8 available cores operating at 2.3 gigahertz (GHz) and includes 8 GB of memory and 1 GB of vswap. Also of note, input container W is located 20 miles from backup container A and 100 miles from backup container B.

Continuing with the example embodiment, with reference to operation 206, intelligent containerization program 122 uses its trained machine learning model to generate: (i) a first backup optimization score for input container W and backup location A, and (ii) a second backup optimization score for input container W and backup location B, using the unstructured container data and configuration data of input container W and the backup location data of backup location A and backup location B, respectively. Specifically, intelligent containerization program 122 generates a first backup optimization score of 0.6 for backup location A and a second backup optimization score of 0.5 for backup location B.

In this example embodiment, intelligent containerization program 122 analyzes the output of the machine learning model and determines the optimal location for the lightweight container (e.g., input container W) based on, at least, the generated backup optimization scores. In this example, intelligent containerization program 122 selects backup location A as being the optimal location for backing up input container W, based on, at least, backup location A having a higher backup optimization score (0.6) than backup location B (0.5).

Figure 3:
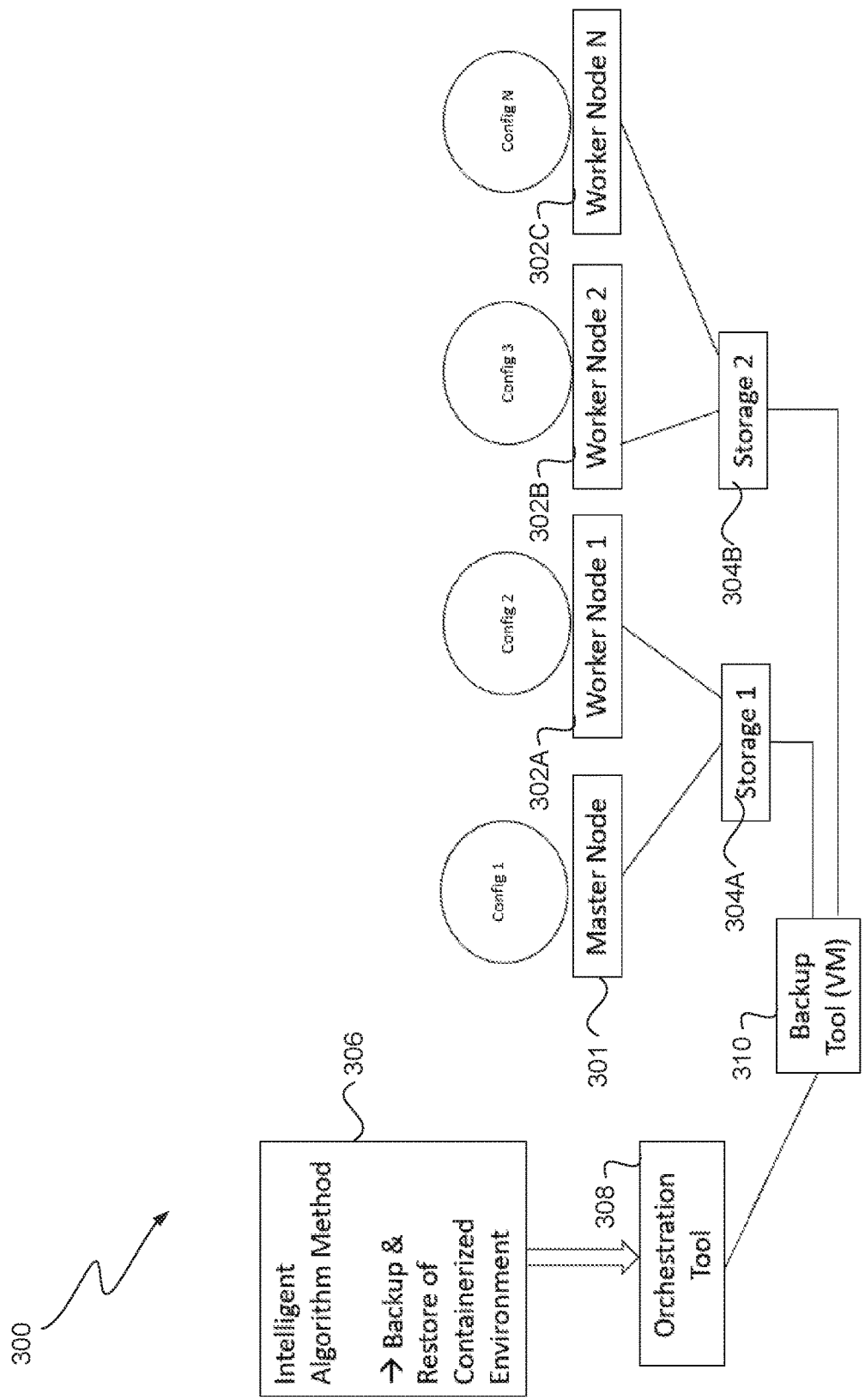
FIG. 3 depicts a component diagram according to at least one embodiment of the present invention.

FIG. 3 is a component diagram, 300, depicting components of the containerized environment of FIG. 1. In various embodiments, the containerized environment includes, at least, one master node 301 and a plurality of worker nodes 302A-302C, wherein the lightweight application is stored on the master and worker nodes. Embodiments of the present invention provide that worker nodes 302A-C are depicted for illustrative simplicity and that there can be any number of worker nodes (e.g., 302C) and the present invention is not limited hereto. In various embodiments, the master node and worker nodes are communicatively connected to storage devices 304A and 304B for backup and restore of the data stored on the lightweight applications. Embodiments of the present invention provide that storage 1 304A and storage 2 304B are depicted for illustrative simplicity and that any number of storage devices can be included in embodiments of the present invention. In various embodiments, the backup and restore algorithm 306 is represented as: Intelligent backup and restore algorithm=Probability of [K-mean+Threshold method+quick identification method]/3. For example, intelligent containerization program 122 determines the optimal backup and restore location based on, at least, the intelligent backup and restore algorithm. In various embodiments intelligent containerization program 122 utilizes an orchestration tool 308 to execute a backup and restore of the data stored on the lightweight application by communicating with a virtual machine 310 that connects to the one or more storage locations.

Figure 4:
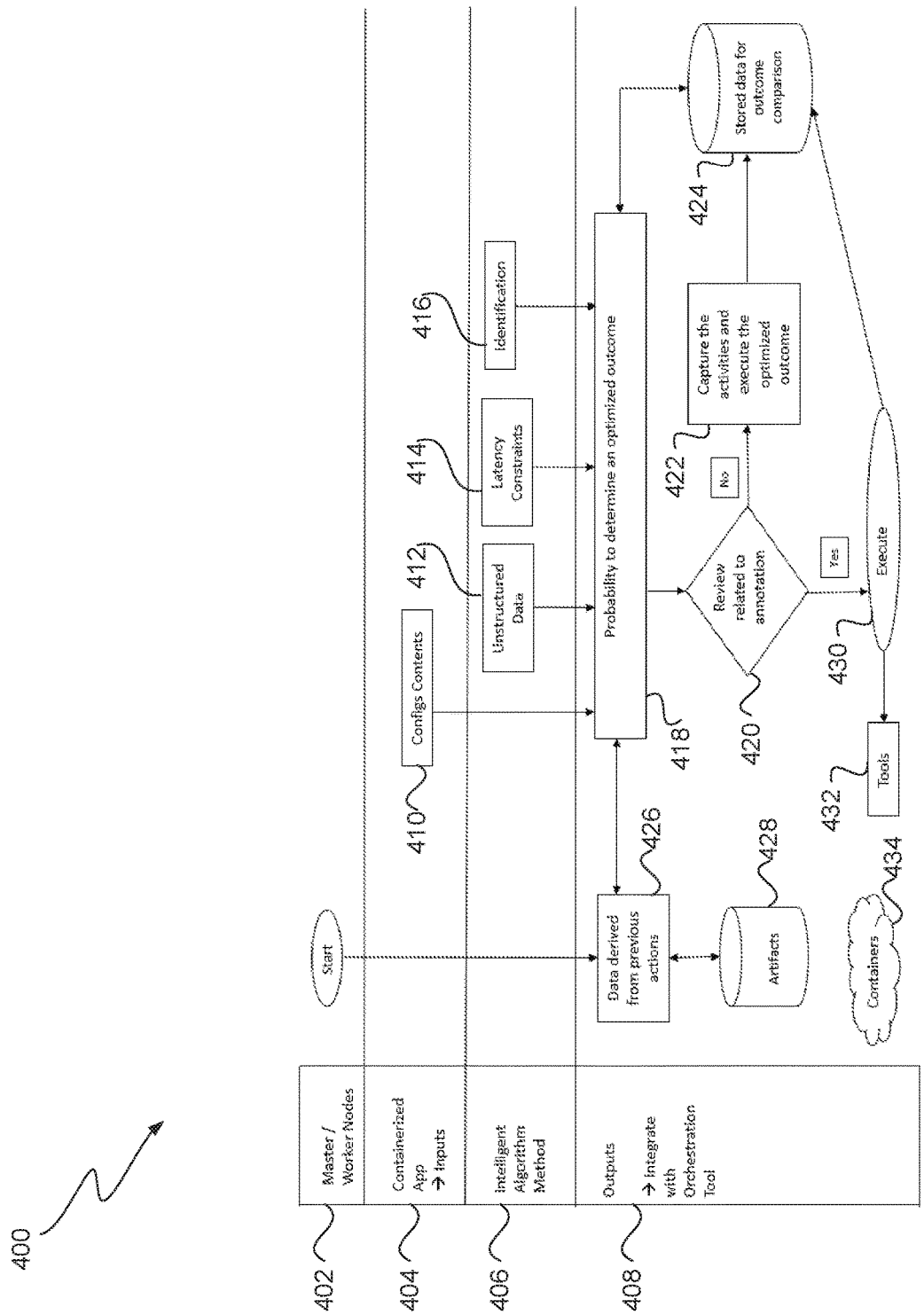
FIG. 4 depicts a block diagram of the containerized environment according to at least one embodiment of the present invention.

FIG. 4 depicts a block diagram, 400, of the containerized environment of FIG. 1. Embodiments of the present invention provide that container 434 are located with the block diagram 400. In various embodiments, the process of the backup and restore method begins at the master nodes and worker nodes 402 that store the lightweight applications, as indicated in FIG. 3. In various embodiments, intelligent containerization program 122 identifies the inputs 404 associated with the intelligent backup and restore algorithm that include, but are not limited to, (i) the configuration contents 410, (ii) unstructured data 412, (iii) latency constraints 414, and (iv) quick identification data 416 (e.g., identification).

In various embodiments, intelligent containerization program 122 utilizes the inputs, identified above, to calculate the optimal storage location for the backup and restore method utilizing intelligent algorithm method 406 (e.g., equation (1)). In various embodiments, the probability to determine an optimized outcome is calculated based on, at least, equation (1). In various embodiments, intelligent containerization program 122 reviews the related annotation data and if intelligent containerization program 122 determines that the optimal storage location has been calculated executes the backup and restore operations 408 (e.g., outputs integrate with orchestration tool). In various embodiments, intelligent containerization program 122 calculates the probability to determine an optimized outcome 418 utilizing, at least, equation (1). Intelligent containerization program 122 determines whether to review related annotations 420. If NO, intelligent containerization program 122 captures the activities and the execution of the optimized outcome from the probability to determine an optimized outcome 422. If YES, intelligent containerization program 122 executes 430 the optimal outcome based on, at least, the related annotation 420. In various embodiments, intelligent containerization program 122 utilizes tools 432 to complete the execution. Intelligent containerization program 122 stores the data for outcome comparison 424 at a subsequent threshold period of time. In various embodiments, intelligent containerization program 122 analyzes data (e.g., stored data for outcome comparison 424) derived from previous actions 426. Intelligent containerization program 122 stores this data as artifacts 428. If intelligent containerization program 122 determines that the optimal storage location has not been calculated, intelligent containerization program 122 calculates the activities associated with the data stored on the lightweight application and executes the optimized outcome. Intelligent containerization program 122 then stores this data for outcome comparison.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned model may include at least five characteristics, at least three service models, and at least four deployment models.

Characteristics are as follows:

On-demand self-service: a cloud consumer can unilaterally provision computing capabilities, such as server-time and network storage, as needed automatically without requiring human interaction with the service's provider.

Broad network access: capabilities are available over a network and accessed through standard mechanisms that promote use by heterogeneous thin or thick client platforms 9 e.g., mobile phones, laptops and PDAs).

Resource pooling: the provider's computing resources are pooled to serve multiple consumer using a multi-tenant model, with different physical and virtual resources dynamically assigned and reassigned according to demand. There is a sense of location independence in that the consumer generally has not control or knowledge over the exact locations of the provided resources but may be able to specify location at a higher level of abstraction (e.g., country, state, or datacenter).

Rapid elasticity: capabilities can be rapidly and elasticity provisioned, in some cases automatically, to quickly scale out and rapidly released to quickly scale in. To the consumer, the capabilities available for provisioning often appear to be unlimited and can be purchased in any quality at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual applications capabilities, with the possible exception of limited user-specific application configuration settings.

Platform as a Service (PaaS): the capability provided to the consumers to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environmental configurations.

Infrastructure as a Service (IaaS): the capability provided to the consumer to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or large industry group and is owned by an organization selling cloud services.

Hybrid cloud: the cloud infrastructure is a composition of two or more cloud (private, community or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
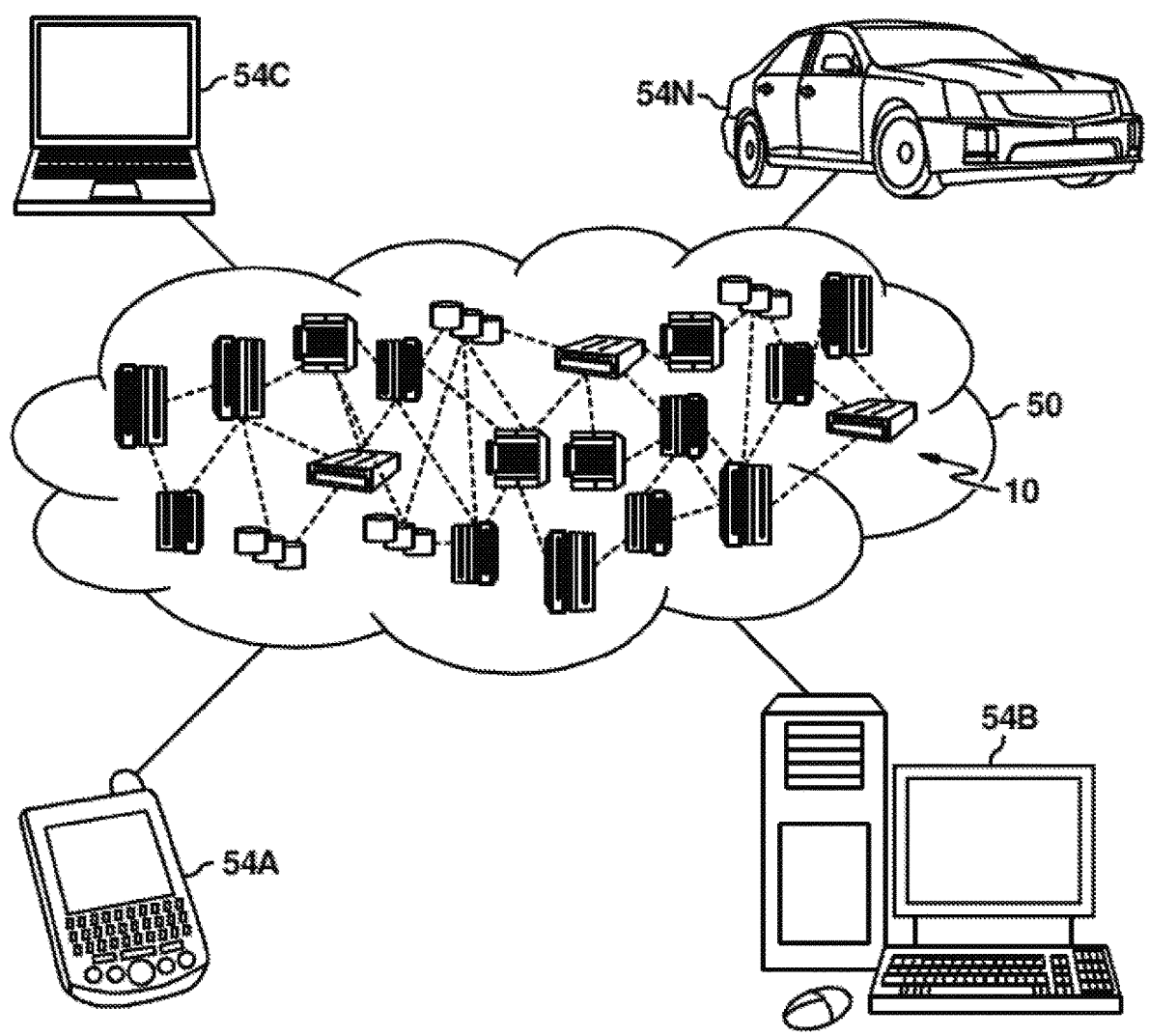
FIG. 5 depicts a cloud computing environment according to at least one embodiment of the present invention.

Referring now to FIG. 5, illustrative cloud computing environment 50 is depicted. As shown, cloud computing environment 50 includes one or more cloud computing nodes 10 with which local computing devices used by cloud consumer: such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
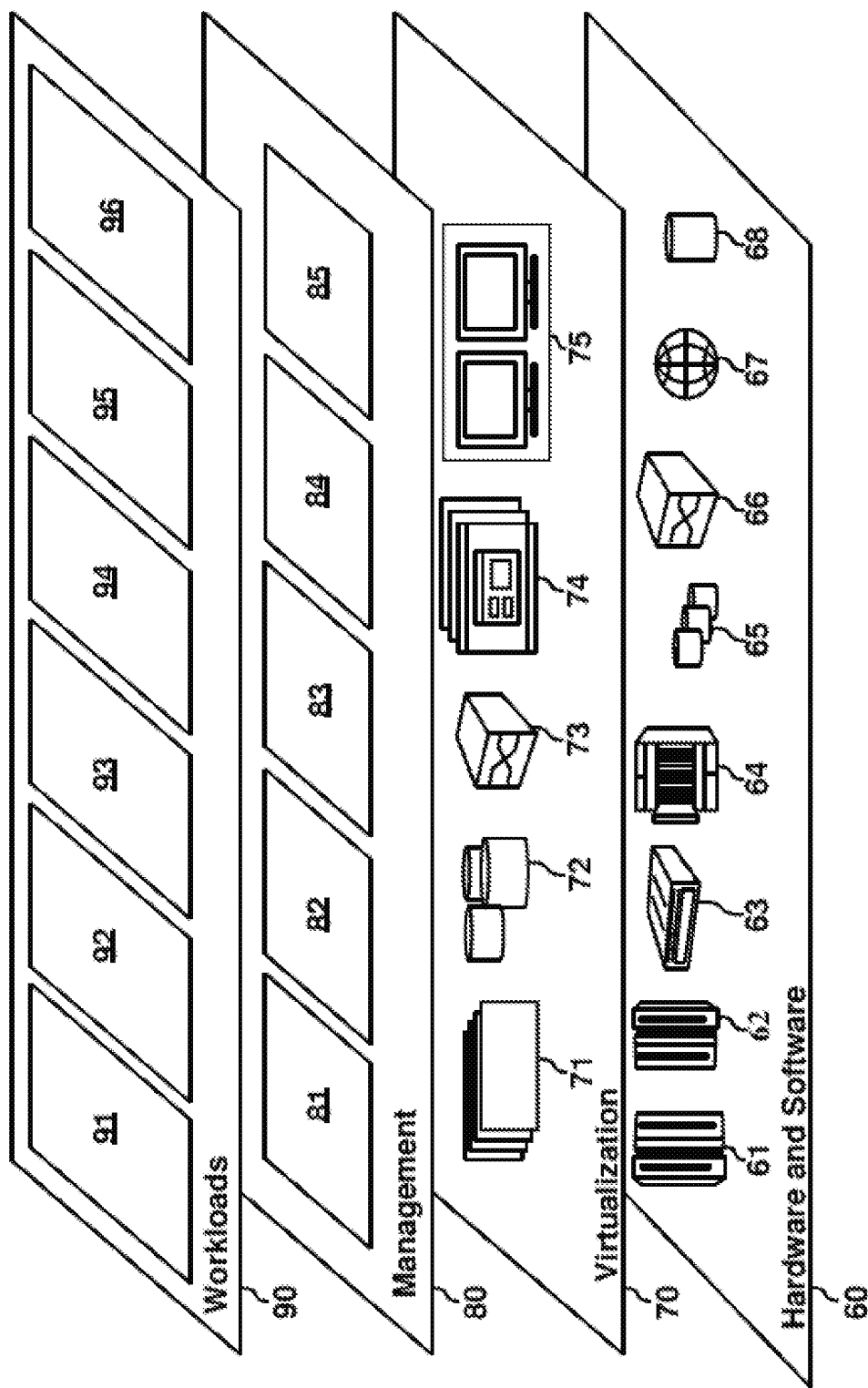
FIG. 6 depicts abstraction model layers according to at least on embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instructions Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73; including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include applications software licenses. Security provides identity verification for cloud consumers and tasks, as well as protection for data and other resources. User portal 81 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing soothing output 96.

Figure 7:
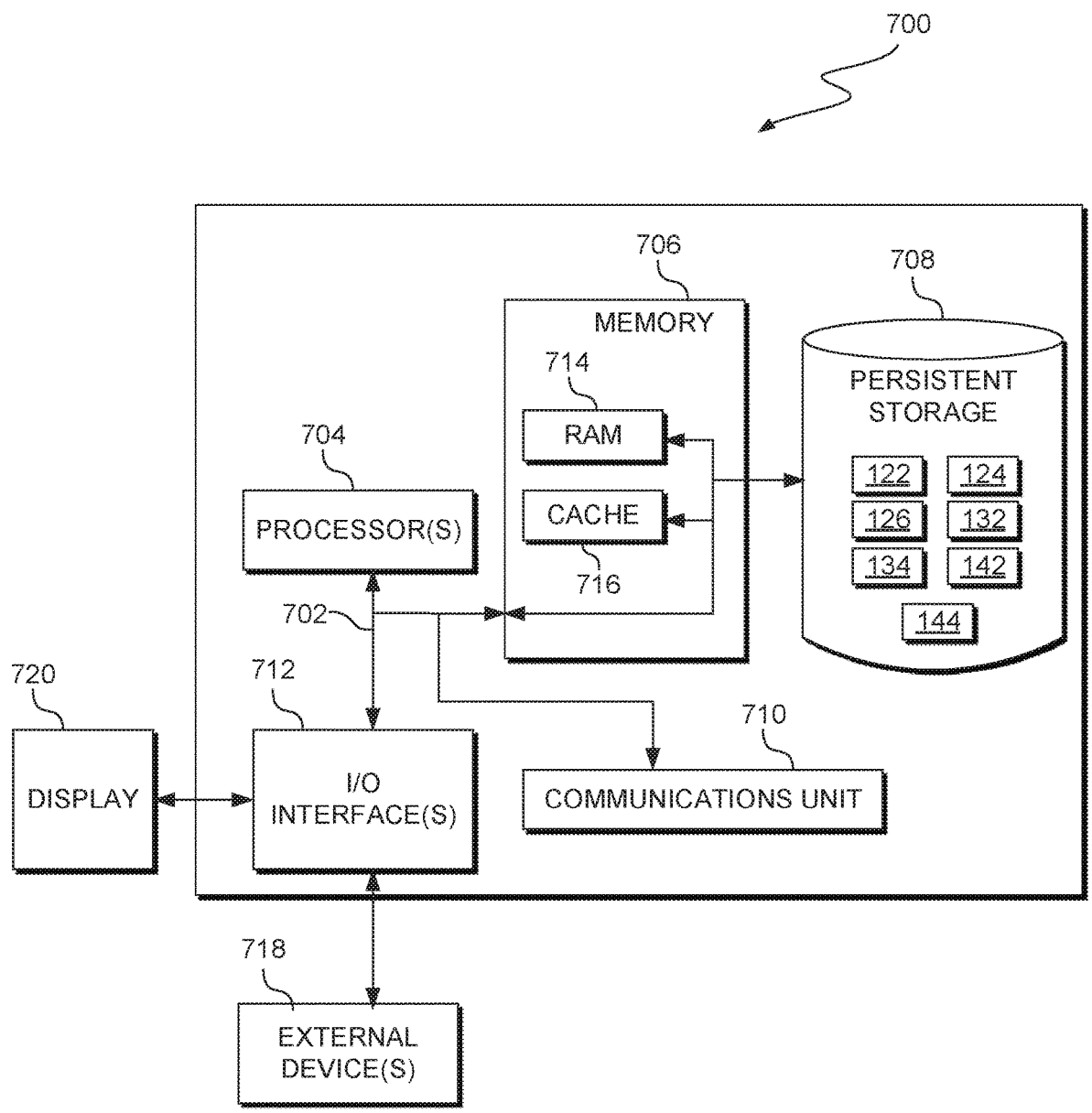
FIG. 7 depicts a block diagram of components of one or more computing devices within the computing environment depicted in FIG. 1, in accordance with an exemplary embodiment of the present invention.

FIG. 7 depicts a block diagram, 700, of components of computer system 120, client device 130, and SAN 140, in accordance with an illustrative embodiment of the present invention. It should be appreciated that FIG. 7 provides only an illustration of one implementation and does not imply any limitations with regard to the environments in which different embodiments may be implemented. Many modifications to the depicted environment may be made.

Computer system 120, client device 130, and SAN 140 includes communications fabric 702, which provides communications between computer processor(s) 704, memory 706, persistent storage 708, communications unit 710, and input/output (I/O) interface(s) 712. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Memory 706 and persistent storage 708 are computer-readable storage media. In this embodiment, memory 706 includes random access memory (RAM) 714 and cache memory 716. In general, memory 706 can include any suitable volatile or non-volatile computer-readable storage media.

Intelligent containerization program 122, computer interface 124, client application 132, client interface 134, server application 142, and database 144 are stored in persistent storage 708 for execution and/or access by one or more of the respective computer processors 704 via one or more memories of memory 706. In this embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer-readable storage medium that is also part of persistent storage 708.

Communications unit 710, in these examples, provides for communications with other data processing systems or devices, including resources of network 110. In these examples, communications unit 710 includes one or more network interface cards. Communications unit 710 may provide communications through the use of either or both physical and wireless communications links. Intelligent containerization program 122, computer interface 124, client application 132, client interface 134, server application 142, and database 144 may be downloaded to persistent storage 508 through communications unit 710.

I/O interface(s) 712 allows for input and output of data with other devices that may be connected to computer system 120, client device 130, and SAN 140. For example, I/O interface 712 may provide a connection to external devices 718 such as a keyboard, keypad, a touch screen, and/or some other suitable input device. External devices 718 can also include portable computer-readable storage media such as, for example, thumb drives, portable optical or magnetic disks, and memory cards. Software and data used to practice embodiments of the present invention, e.g., intelligent containerization program 122, computer interface 124, client application 132, client interface 134, server application 142, and database 144, can be stored on such portable computer-readable storage media and can be loaded onto persistent storage 708 via I/O interface(s) 712. I/O interface(s) 712 also connect to a display 720.

Display 720 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) such as, for example, "Smalltalk" and the like may be subject to trademark rights in various jurisdictions throughout the world and are used here only in reference to the products or services properly denominated by the marks to the extent that such trademark rights may exist.

What is claimed is:

1. A computer-implemented method, the method comprising:
    identifying, by one or more processors, a set of training data, wherein the training data identifies a lightweight container, a corresponding backup lightweight container, and an optimization score for the lightweight container and the corresponding backup lightweight container;
    training, by the one or more processors, an intelligent containerization machine learning model utilizing the identified training data;
    identifying, by the one or more processors, utilizing the intelligent containerization machine learning model, a new lightweight container for backing up, the new lightweight container being communicatively connected to a storage device;
    identifying, by the one or more processors, available backup lightweight containers; and
    determining, by the one or more processors, an optimal backup lightweight container for the new lightweight container utilizing the trained intelligent containerization machine learning model, the optimal backup lightweight container being a respective one of the available backup lightweight containers that, when paired with the new lightweight container as an input to the trained intelligent containerization machine learning model, results in a highest respective optimization score,
    wherein:
    the training data further identifies: (i) unstructured container data for the lightweight container, (ii) configuration data for the lightweight container, and (iii) backup data for the backup lightweight container; and
    the new lightweight container includes corresponding unstructured container data and configuration data.

2. The computer-implemented method of claim 1, wherein:
    the unstructured container data includes text data for the lightweight container, wherein the text data includes at least a container name and log data;
    the configuration data includes hardware and software requirements for the lightweight container; and
    the backup data includes hardware and software features for the backup lightweight container.

3. The computer-implemented method of claim 1, wherein the determined optimal backup lightweight container runs on a plurality of nodes in a container environment, wherein the plurality of nodes includes a master node and one or more worker nodes communicatively connected to the storage device for backup and restore of data stored on the lightweight applications.

4. The computer-implemented method of claim 1, the method further comprising:
    identifying, by the one or more processors, one or more patterns from the unstructured container data for the lightweight container; and
    utilizing, by the one or more processors, the identified one or more patterns in training the intelligent containerization machine learning model,
    wherein the determined optimal backup lightweight container for the new lightweight container is determined based, at least in part, on respective patterns from the unstructured container data of the new lightweight container.

5. The computer-implemented method of claim 4, wherein the identifying of the one or more patterns utilizes a K-mean algorithm.

6. The computer-implemented method of claim 5, further comprising:
    generating, by the one or more processors, the optimization score for the lightweight container and the corresponding backup lightweight container, wherein the optimization score is based, at least in part, on the intelligent backup and restore algorithm considering: (i) a result of the K-mean algorithm, (ii) a latency constraint, and (iii) a required backup period of time.

7. A computer program product comprising:
    one or more computer-readable storage media and program instructions stored on the one or more computer-readable storage media, the stored program instructions comprising:
    program instructions to identify a set of training data, wherein the training data identifies a lightweight container, a corresponding backup lightweight container, and an optimization score for the lightweight container and the corresponding backup lightweight container;
    program instructions to train an intelligent containerization machine learning model utilizing the identified training data;
    program instructions to identify, utilizing the intelligent containerization machine learning model, a new lightweight container for backing up, the new lightweight container being communicatively connected to a storage device;
    program instructions to identify available backup lightweight containers; and
    program instructions to determine an optimal backup lightweight container for the new lightweight container utilizing the trained intelligent containerization machine learning model, the optimal backup lightweight container being a respective one of the available backup lightweight containers that, when paired with the new lightweight container as an input to the trained intelligent containerization machine learning model, results in a highest respective optimization score,
wherein:
the training data further identifies: (i) unstructured container data for the lightweight container, (ii) configuration data for the lightweight container, and (iii) backup data for the backup lightweight container; and
the new lightweight container includes corresponding unstructured container data and configuration data.

8. The computer program product of claim 7, wherein:
the unstructured container data includes text data for the lightweight container, wherein the text data includes at least a container name and log data;
the configuration data includes hardware and software requirements for the lightweight container; and
the backup data includes hardware and software features for the backup lightweight container.

9. The computer program product of claim 7, wherein the determined optimal backup lightweight container runs on a plurality of nodes in a container environment, wherein the plurality of nodes includes a master node and one or more worker nodes.

10. The computer program product of claim 7, the stored program instructions further comprising:
program instructions to identify one or more patterns from the unstructured container data for the lightweight container; and
program instructions to include the identified one or more patterns in training the intelligent containerization machine learning model,
wherein the determined optimal backup lightweight container for the new lightweight container is determined based, at least in part, on respective patterns from the unstructured container data of the new lightweight container.

11. The computer program product of claim 10, wherein the identifying of the one or more patterns utilizes a K-mean algorithm.

12. The computer program product of claim 11, the stored program instructions further comprising:
program instructions to determine the optimization score for the lightweight container and the corresponding backup lightweight container, wherein the optimization score is based, at least in part, on: (i) a result of the K-mean algorithm, (ii) a latency constraint, and (iii) a required backup period of time.

13. A computer system, the computer system comprising:
one or more computer processors:
one or more computer readable storage medium; and
program instructions stored on the computer readable storage medium for execution by at least one of the one or more processors, the stored program instructions comprising:
program instructions to identify a set of training data, wherein the training data identifies a lightweight container, a corresponding backup lightweight container, and an optimization score for the lightweight container and the corresponding backup lightweight container;
program instructions to train an intelligent containerization machine learning model utilizing the identified training data;
program instructions to identify, utilizing the intelligent containerization machine learning model, a new lightweight container for backing up, the new lightweight container being communicatively connected to a storage device;
program instructions to identify available backup lightweight containers; and
program instructions to determine an optimal backup lightweight container for the new lightweight container utilizing the trained intelligent containerization machine learning model, the optimal backup lightweight container being a respective one of the available backup lightweight containers that, when paired with the new lightweight container as an input to the trained intelligent containerization machine learning model, results in a highest respective optimization score,
wherein:
the training data further identifies: (i) unstructured container data for the lightweight container, (ii) configuration data for the lightweight container, and iii) backup data for the backup lightweight container; and
the new lightweight container includes corresponding unstructured container data and configuration data.

14. The computer system of claim 13, wherein:
the unstructured container data includes text data for the lightweight container, wherein the text data includes at least a container name and log data;
the configuration data includes hardware and software requirements for the lightweight container; and
the backup data includes hardware and software features for the backup lightweight container.

15. The computer system of claim 13, the stored program instructions further comprising:
program instructions to identify one or more patterns from the unstructured container data for the lightweight container; and
program instructions to include the identified one or more patterns in training the intelligent containerization machine learning model,
wherein the determined optimal backup lightweight container for the new lightweight container is determined based, at least in part, on respective patterns from the unstructured container data of the new lightweight container.

16. The computer system of claim 15, wherein the identifying of the one or more patterns utilizes a K-mean algorithm.

17. The computer system of claim 16, the stored program instructions further comprising:
determining, by one or more processors, the optimization score for the lightweight container and the corresponding backup lightweight container, wherein the optimization score is based, at least in part, on: (i) a result of the K-mean algorithm, (ii) a latency constraint, and (iii) a required backup period of time.

* * * * *